United States Patent
Krzyminski

[11] Patent Number: 5,986,769
[45] Date of Patent: Nov. 16, 1999

[54] HAND-HELD INSTRUMENT FOR REFLECTION MEASURING ON PRINTED SHEETS AND TEST CHARTS

[76] Inventor: Ulrich Krzyminski, Wiesbadener Strasse 27, D-61462 Königstein, Germany

[21] Appl. No.: 09/061,396

[22] Filed: Apr. 16, 1998

[30] Foreign Application Priority Data

Apr. 17, 1997 [DE] Germany .......................... 197 16 066

[51] Int. Cl.[6] .................................................. G01N 21/55
[52] U.S. Cl. .......................................................... 356/445
[58] Field of Search .................................. 356/445–448, 356/402–411, 416–419; 400/88; 250/226; 358/473

[56] References Cited

U.S. PATENT DOCUMENTS

| | | |
|---|---|---|
| 4,403,419 | 9/1983 | Graves . |
| 4,505,589 | 3/1985 | Ott et al. . |
| 4,901,164 | 2/1990 | Kurosawa . |
| 5,038,492 | 8/1991 | Bryant et al. . |
| 5,073,028 | 12/1991 | Bowden et al. . |
| 5,115,227 | 5/1992 | Keiji . |
| 5,373,364 | 12/1994 | Krzyminski . |
| 5,595,445 | 1/1997 | Bobry . |
| 5,691,817 | 11/1997 | Cargill et al. . |

*Primary Examiner*—K. P. Hantis
*Attorney, Agent, or Firm*—Webb Ziesenheim Logsdon Orkin & Hanson, P.C.

[57] ABSTRACT

The present invention relates to a hand-held instrument for reflection measuring on printed sheets and test charts, which includes a housing with a base plate, a measuring head, a display field, a plurality of operating keys, and a measuring and evaluating electronic unit. According to the invention, a parallel guide plate is provided on a mounting side of the measuring head, at a bottom longitudinal edge of the housing, the guide plate in the area of the measuring head is provided with a view recess for a measuring hole thereof.

8 Claims, 8 Drawing Sheets

105   104        Fig. 2

HAND-HELD INSTRUMENT FOR REFLECTION MEASURING ON PRINTED SHEETS AND TEST CHARTS

BACKGROUND OF THE INVENTION

1. Field of the Invention

The present invention relates to a hand-held instrument for reflection measuring on printed sheets and test charts.

2. Description of Prior Art

Hand-held instruments of the afore-described type are known, for example, from German Patent 43 05 968. Measuring of the optical density and of the colorimetrical characteristic values on printing control strips and test charts is accomplished by a movement manually performed by the instrument on the measuring surface, thereby scanning a major number of measuring fields. Moreover, the hand-held instrument is able to perform measurements within the image, with the instrument being positioned on the selected points with repetitive accuracy.

Reflection measurements on printed sheets and test charts are performed for determining the optical density and the characteristic values derived therefrom, such as dot gain and print contrasts. Moreover, colorimetrical measurements are performed by tristimulus instruments and spectral photometers for determining the CIE-values on test charts and printed products of the most various types. Some of the spectral photometers are suitable to measure both the characteristic values of the optical density and the colorimetrical characteristic values in combination.

In density measurements on prints, printing control strips are printed at the edge of the sheet, with the printing control strips including series-arranged control fields for the colors involved in multi-color prints. The preferred standard process colors for the four-color print are cyan, magenta, yellow and black. In the majority of cases, the control fields are of a width of only 5 to 6 mm so that a printing control strip extending across the entire printing width, with an average sheet format, can consist of more than 200 control fields.

Test charts used for full-format testing and for optimizing the printing quality of the printing machines contain an even larger number of control fields. A completely new type of test charts has been developed for the color calibration of digital proof instruments, the control fields of which, mostly, are colorimetrically measured. In order to achieve the color calibration computed by special software programs, substantially for the entire visible color space, test charts have been developed for the so-called color management that contain between 200 and 2000 measuring fields. The conventional test chart of the international ANSI IT 8.7/3-1993 standard contains, for example, 928 measuring fields.

Conventionally, printing control strips and test charts are evaluated by hand-held instruments suitable to successively measure respectively one control field at a time. Instruments of that type are inexpensive but too slow for a fast and comfortable evaluation of a large number of control fields. This disadvantage could not be overcome either by a design in which the measuring head is moved by motor power (see European Patent 0 171 360) according to which the instrument must still be moved from one field to the next one and a circular aperture designed as a detector is required to be precisely positioned within the measuring field before releasing the power-driven motion of the measuring head, with the latter being moved from an opening within the instrument, stopping briefly over the measuring field and then returning to its initial position.

An essential improvement has been achieved with a hand-held instrument in which the power-driven measuring head is moved along a line across a plurality of control fields, at the same time measuring the individual fields (see German Patent 37 23 701). In this way, between twelve and twenty-four fields can be scanned in one run.

An evaluation of complete printing control strips across the entire length thereof in one run at the present time can be performed only by large scan-densitometers which are true measuring machines that, technically, are highly sophisticated and correspondingly expensive.

Even higher technical efforts are involved with plotters moving the measuring head in the XY-direction thereby enabling the automatic evaluation of entire test charts. However, plotters of this type involve the unique advantage that they also enable measurements within the printed picture to be performed because the measuring head can be focused on any desired points within the picture with a high repetitive accuracy, while a hand-held instrument permits retrieval of predetermined points of measurement in the picture to a limited extent only.

SUMMARY OF THE INVENTION

It is the primary object of the invention to improve hand-held instruments of the afore-described type to the effect that a large number of measuring points can be scanned and evaluated in one run substantially faster than hitherto possible with conventional hand-held instruments.

A first and substantially simple option resides in that a parallel guide plate is arranged on the mounting side of the measuring head at the lower longitudinal edge of the housing, with the guide plate, in the area of the measuring head, being provided with a view recess for the measuring opening thereof.

The former option, admittedly, requires the use of a rail to be suitably secured to the printed test sheet along the printing control strip; however, the design of the invention enables the hand-held instrument to be rapidly and continuously displaced in parallel along the rail over all measuring fields of the printing control strip. This has not been possible with conventional hand-held instruments for the simple reason that the measuring head has always been in the way, irrespective how it was mounted on or associated to the housing.

According to a second solution involving somewhat greater mechanical efforts, a parallel guide of this type, without relying on the use of a rail or rule is achieved, in the practice of the invention, in that a guide roller protruding during measurement from the base plate by a few tenths of a millimeter is mounted on the base plate with the axis thereof extending in a direction transverse to the direction of the scanning movement. According to another embodiment, an electronic rotary encoder is arranged on the axis of the guide roller, with the rotary encoder being connected to an electronic circuit for evaluating and converting the signals of the rotary encoder into distances, with the circuit, in turn, being in communication with the measuring and evaluating electronic unit.

Apart from the fact that a so designed instrument due to the parallel guide roller can be guided in parallel without the provision of a rail, this embodiment of the invention has created the basis for developments enabling reproducible measurements to be performed also within the picture as such.

Basically, according to both solutions, the hand-held instrument of the invention can be guided in a manually performed continuous straight-line movement over a plurality of control fields, with the beginning and end of the individual measuring fields being recognized and the measuring fields individually evaluated by their optical density or by their colorimetrical values. The transition from one measuring field to the next one is recognized by the reflectance values continuously measured at short intervals.

The second solution involves the additional advantage that the distance covered is additionally measured by a special measuring instrument in which the at least one guide roller connected to electronic rotary encoders or an omnidirectionally movable ball will roll along the printed sheet or the test chart yet to be explained in greater detail hereinafter.

The compact design and especially the rigid arrangement of the measuring head within the instrument according to German Patent 43 05 968 enable the entire instrument to be manually guided across the printing control strip or a row of measuring fields. Due to the location of the measuring head on the instrument on the side facing the operator, and the special configuration of the cylindrical measuring light channel the respective position of the instrument and of the measuring head can be controlled during movement thereof relative to the printing control strip or the measuring field row.

BRIEF DESCRIPTION OF THE DRAWINGS

The above and other features and advantages of this invention will become apparent from the following detailed description of preferred embodiments, taken in connection with the accompanying drawings, wherein.

DETAILED DESCRIPTION OF PREFERRED EMBODIMENTS

The hand-held instrument still comprises the measuring head including the measuring light channel, a housing having a display, operating keys and a measuring and electronic evaluating unit.

Figure 1:
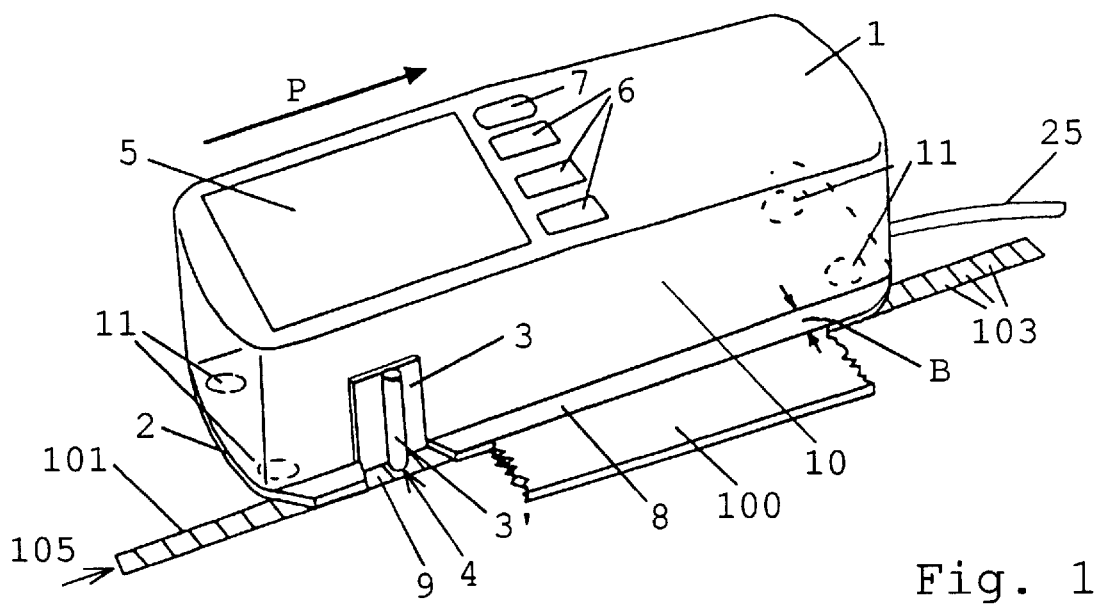
FIG. 1 is a perspective view of the hand-held instrument according to the former option provided with the associated parallel guide plate as applied to the printing control strip of a printed sheet.

FIG. 1 shows the form of embodiment of the hand-held instrument according to the former option which, by using a rule or rail 100, is suitable to scan printing control strips 101 and test field rows 105 through a manually performed movement of the hand-held instrument toward arrow P. The printing control strip 101 is made up of a plurality of series-arranged control fields 103 distinguishing by density or color. The externally recognizable elements of the instrument are: housing 1, display 5, operating keys 6, a start key 7 and measuring head 3 which in part and along with its measuring light channel 3'on the side facing the operator protrudes from housing 1. The hand-held instrument includes a base plate 2 on which are located all elements, such as the measuring head 3, the housing 1 and the printed circuit board (not shown) including the electronic measuring and evaluating unit (see FIG. 7).

Apart from the fact that the parallel guide plate 8 can also be mounted on and secured to the base plate 2 as a separate unit, the parallel guide plate 8, advantageously is formed— as shown—from an edge of the base plate 2 protruding beyond the longitudinal side face 10 of the housing 1, with the edge, in the area of the measuring head 3, being provided with a view recess 9 to enable the operator to watch the position of the measuring aperture 4 over the control fields 103 from the beginning to the end of the measuring process. By applying rule 100 in parallel to the printing control strip 101, the hand-held instrument with the parallel guide plate 8 thereof along the rule 100 can be guided along a straight line across the printing control strip. The width B of the parallel guide plate 8, feasibly, is so dimensioned that the measuring aperture 4 is located centrally of the control fields 103 usually six millimeters high once rule 100 is applied to the bottom edge of the printing control strip 101, thereby assisting the operator to rapidly associate rule 100, printing control strip and hand-held instrument without affecting measurements on larger control fields. To prevent the hand-held instrument from bearing, with the whole of its bottom face, on the printed sheet 110, four crowned discs 11 of slightly slidable plastic material are arranged in the base plate 2 to provide a distance of a few tenths of a millimeter between the base plate 2 and the printed sheet 110. A pre-selection to individual measurements or to continuous scanning of several control fields 103 can be made by setting one of the operating keys 6. The pre-selection is shown in display 5. If the hand-held instrument is set to individual measurements the measuring aperture 4 thereof will be displaced, in the usual way, stepwise from one field to the next one, with the start key 7 respectively starting and performing one measurement per field. When setting to continuous scanning, the start key 7 will initiate and automatically end the measuring operation once the hand-held instrument is no longer advanced and the measuring signal no longer changes.

In addition, the measuring operation can be terminated by a second operation of the start key 7. The measured values of the scanned fields can be successively shown in the display by actuating one of the operating keys 6. However, preferably, the measuring instrument, through a bi-directional interface, via data cable 25, is connected to a computer in order to electronically evaluate and clearly display the measured data of the multiplicity of control fields.

Figure 2:
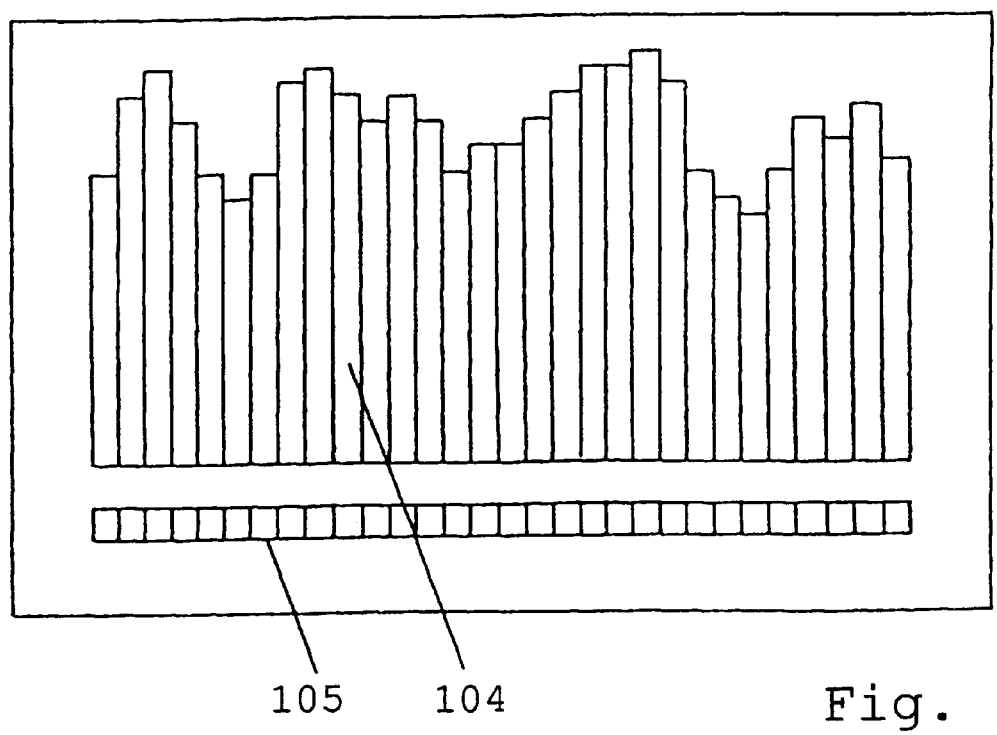
FIG. 2 typically shows a measured value profile as a result of an electronic evaluation.

One of the standard illustrations on the monitor is, for example, that the density values 104—as shown in FIG. 2—are illustrated as a profile over the control field row 105. Similarly, colorimetrical values or deviations thereof from pre-determined nominal values can be displayed.

Due to the connection of the measuring instrument to a computer the display 5 can be eliminated to reduce the number of operating elements to start key 7. Also, the electronic unit of the measuring instrument can be limited to gaining, amplifying and digitizing functions and to the preliminary storage of the measured signals if data processing is continued in a computer, thereby enabling the measuring instrument to be designed as a particularly compact, light-weight and low-priced unit.

To accomplish the simple design of the hand-held instrument as shown in FIG. 1 it is required that the individual measuring fields 103 during scanning of the printing control strip 101 with the aid of the measuring signals be identified with no special distance measurement, which will be possible under the following conditions:

Considering the practical handling it can be assumed that the operator can guide the measuring instrument approximately within one second across the width of a standardized DIN A4 format sheet. This will correspond to a scanning speed of about 200 mm/second, meaning that a printing control strip 1000 mm long in an average printing format is scanned within five seconds. Further assuming that during the movement of the hand-held instrument measurements are made at intervals of 1 millisecond, then the individual measurements are at distances of 0.2 mm. With a measuring field width of five millimeters, this will correspond to twenty five individual measurements per field, it being understood that only measurements made in the central part of the measuring field can be evaluated. The number of individual measurements per field will increase as long as the hand-held instrument is moved slowly and will decrease with a faster movement.

Figure 3:
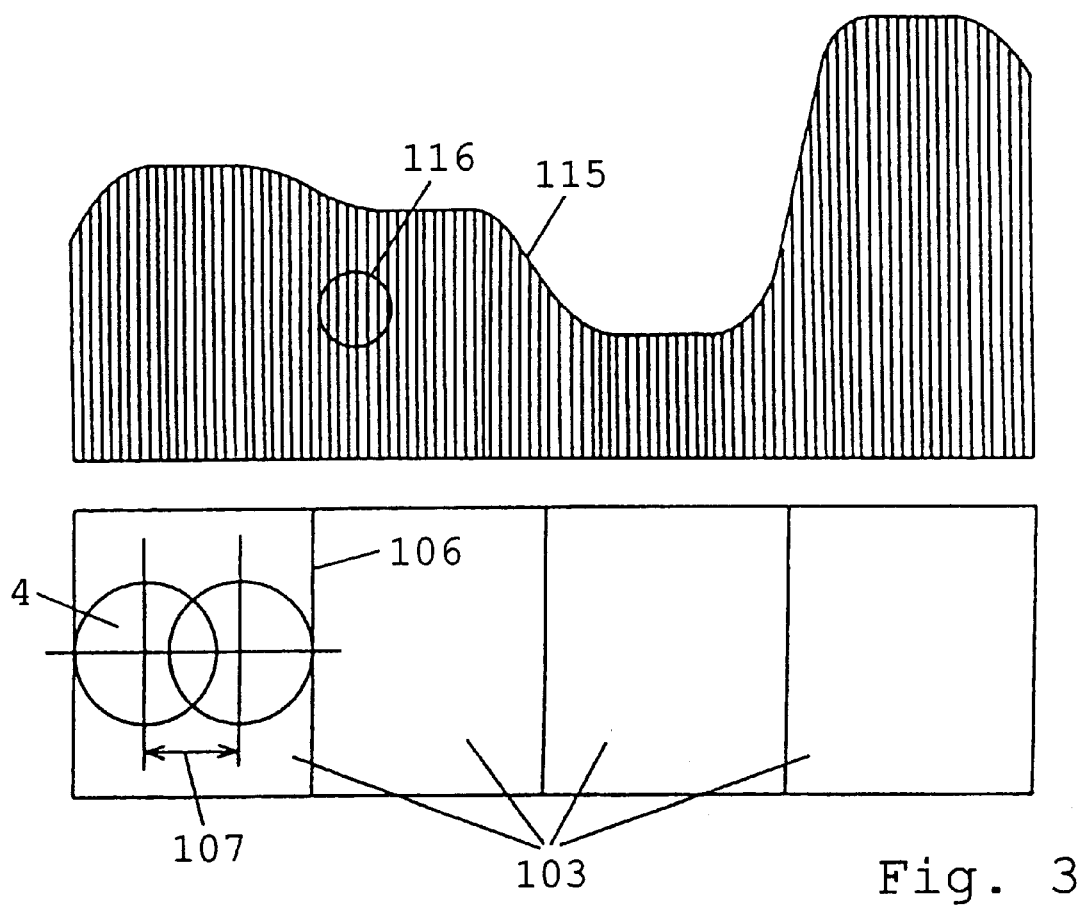
FIG. 3 shows the principle of the optoelectronic recognition of measuring fields.

Based on the large number of individual measurements, the measuring fields 103 are distinguishable from one another. The change in the measuring aperture 4 from one measuring field to the next one can be identified by way of the profile of the measured value formed during scanning of the row of the measuring fields. FIG. 3 shows four series-arranged measuring fields 103 of different color or density as well as the measured value profile 115 formed by the series-arrangement of the digitized measured signals 116. FIG. 3 is based on conditions according to which the width of the measuring fields 103 is five millimeters and the measuring head 3 with the measuring aperture 4 of a 3 mm diameter is guided at a rate of 200 mm/sec across the measuring fields, and that the individual measurements are at intervals of 1 millisecond. In the circumstances, twenty five digital measuring signals are obtained by the analog-digital converter 38 of the electronic unit of the instrument which measuring signals are stored in a storage module of the electronic unit of the instrument and are available for evaluation.

Evaluable measuring signals during scanning are formed in the central area 107 only as long as the measuring aperture 4 is completely within the measuring field 103. As soon as the measuring aperture 4 exceeds the measuring field limit 106 signals formed from a mixture of the density or color of the two neighboring measuring fields 103 and not considered for evaluation, will be measured. The measured signals suitable for evaluation are from the central area 107 of the measuring field 103 and are characterized in that they are of equal size. The measuring signals not suitable for evaluation are from the transitory area from one measuring field 103 to the next one and are decreasing or increasing, depending on whether the following measuring field is of a weaker or stronger color. Based thereon, the individual control fields 103 are optoelectronically identified. This identification involves the advantage that also measuring fields 103 of different width within one row can readily be recognized, provided that a certain width is not fallen below. Moreover, negligible fluctuations in the measured values can be offset by a special evaluation of the useful signals, such as computation of the average value and the like mathematical processes, thereby taking into consideration color fluctuations due to printing techniques.

Another embodiment of the hand-held instrument resides in that the same, during the scanning movement, is guided along a straight line or in parallel through a guiding roller 12 provided in the base plate 2 so that rule 100 shown in FIG. 1 and serving as an aid can be eliminated. At the same time, the guiding roller 12 can be used for a distance measurement thereby supporting not only the identification of the measuring field but also enabling an advantageous evaluation of color flows.

Figure 4:
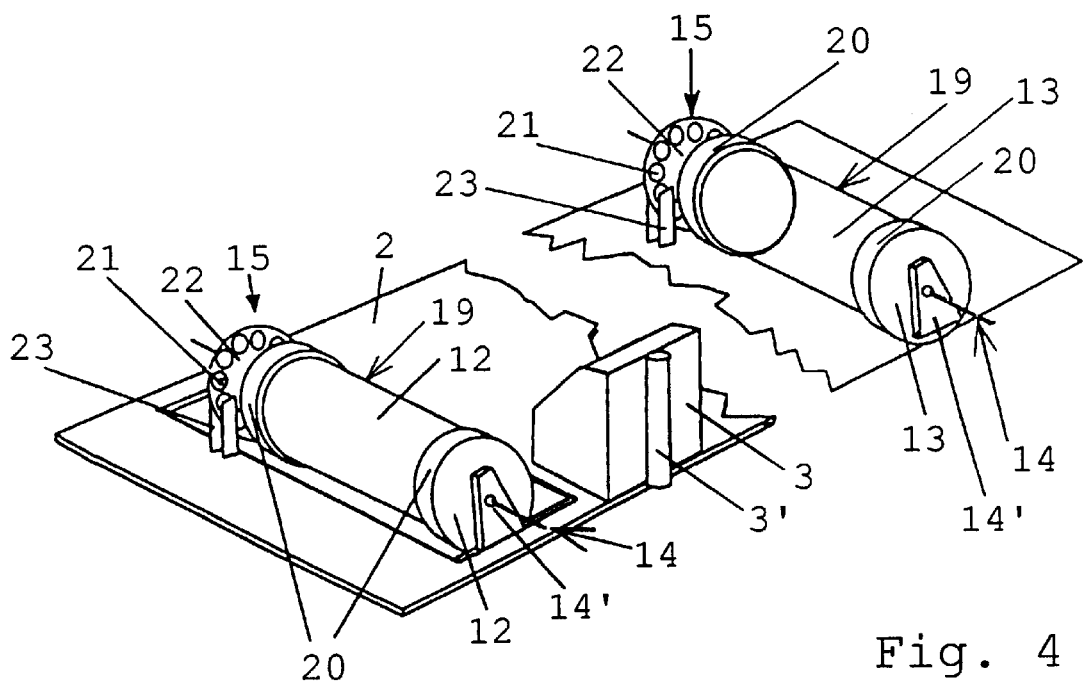
FIG. 4 is a perspective and schematic view of the base plate of the hand-held instrument according to the second option of the invention.

FIG. 4 shows the arrangement of a guide roller 12 of this type on the base plate 2. The guide roller 12 is pivotally arranged within bearings 14', replacing two of the sliding discs 11 in the embodiment according to FIG. 1. The guide roller 12 protrudes downwardly by a few tenths of a millimeter from the base plate 2 and, during displacement of the hand-held instrument on the printed sheet 110, is caused to rotate. Rolling of the guide roller 12 along the printed sheet 110 forces a straight-line movement of the hand-held instrument to be performed. If the longitudinal axis of the hand-held instrument prior to measurement is aligned in parallel with the printing control strip, then the hand-held instrument in the course of the manually performed movement is displaced in parallel to the printing control strip 101. To avoid slip between the guide roller 12 and the printed sheet 110, the guide roller 12 is made of hard rubber or a material having a similarly high friction coefficient. To avoid, conversely, a contact of the guide roller 12 along its entire length on the printed sheet 110, the same is provided with a wide flat groove 19 so that only two outer roll-off rings 20 will get into contact with the printed sheet 110.

The guide roller 12, in conjunction with the afore-described optoelectronic identification of the measuring field, results in an operable hand-held instrument suitable to scan printing control strip and rows of measuring fields by a movement of the measuring instrument by hand, with no need of relying on an additional aid.

According to another form of embodiment, an incremental rotary encoder 15 is arranged on axis 14 of the guide roller 12, to permit measurements of the distance covered by the hand-held instrument. Rotary encoders of this type are known in the art and are commercially available, working on the principle that a disc 22 provided with holes or bar codes 21 is guided through a light barrier 23. The so generated pulses are supplied to a pulse counter provided in the electronic unit of the instrument (FIG. 7), and are converted into distances, thereby enabling the measuring signals described with reference to FIG. 3 to be associated to their point of measurement on the printing control strip and in the measuring field. Rotary encoders including two rows of holes or light barriers supply two pulse rows phase-shifted by 90°, not only recognizing the distance measurement but also the direction of movement. An incorrect operation of the hand-held instrument residing in a temporary movement in the wrong direction can in this way be recognized and signaled or rectified.

The straight-line guide of the hand-held instrument can be further improved by a second guide roller 13 (to the right in FIG. 4) so that the hand-held instrument even when handled less carefully will keep its track. Comparing the pulses of the rotary encoder 15 of the two guide rollers 12, 13 indicates whether both guide rollers 12, 13 roll without skid along the printed sheet 110 and whether the distances are correctly measured. In case of low skid, the distance measurement can be suitably rectified. Heavy skid will result in an acoustic or visual error indication and in a termination of the measuring process. Moreover, the pulse rate of one of the rotary encoders 15 can serve as an error indication in case of an excessively fast movement of the hand-held instrument. However, the most important function of the distance measurement resides in that shaded colors can be taken up thereby enabling measurements to be made in the printed picture.

Measurements of the afore-described type performed within the picture will be required if for space reasons no printing control strips 101 can be provided on the printed sheet 110, or if the colorimetrical values are to be compared in the printed picture at preselected points with a proof or with the original. In this respect it is necessary for the image points selected for measurement to be precisely specified because otherwise picture-dependent color changes erroneously could be interpreted as color fluctuations due to printing process.

Figure 5:
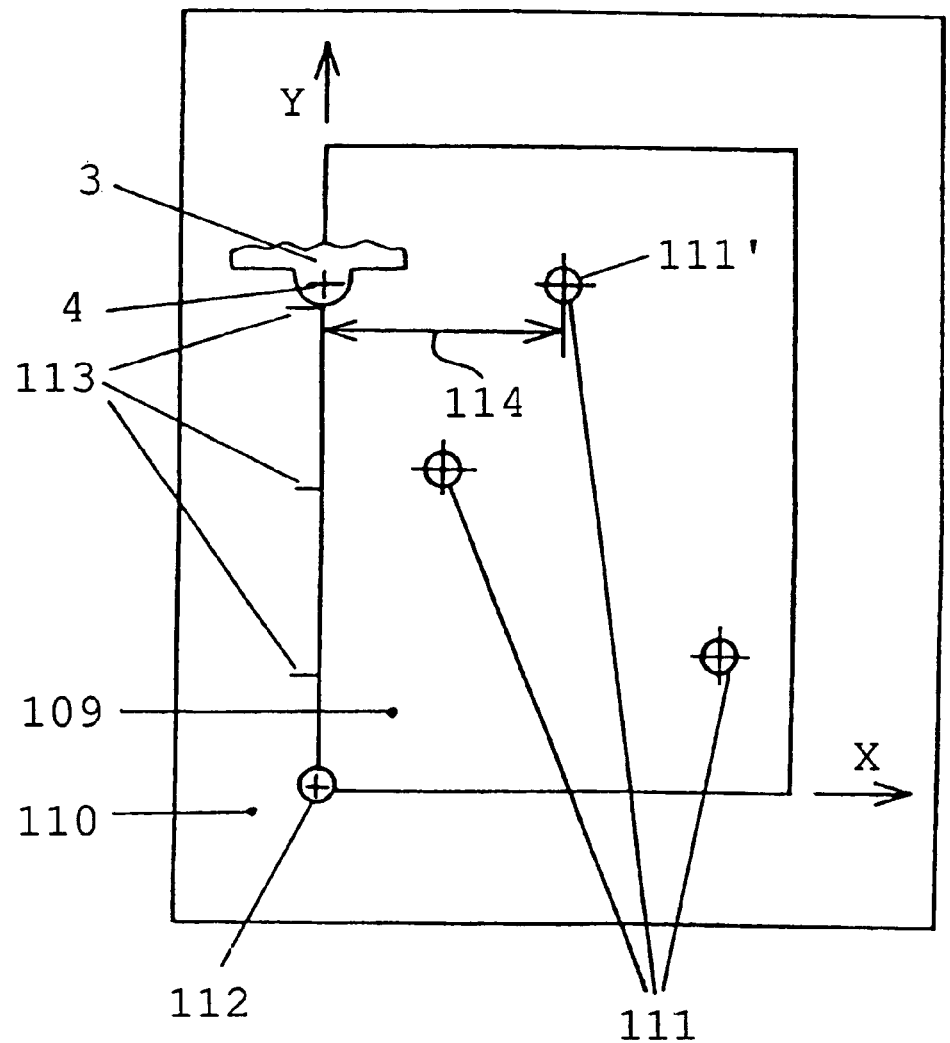
FIG. 5 shows the process of measuring within the picture.

The hand-held instrument furnished with one or two guide rollers 12, 13 and rotary encoders 15 can be used for measurements within the picture if one proceeds according to the method described hereinafter with reference to FIG. 5. In the picture field of the printed sheet 110 designated in FIG. 5 by reference numeral 109 three points 111 of the picture selected for measurement are illustrated by way of example. The starting point of the XY coordinates, feasibly, is one of the corner points of the picture presently designated by numeral 112. As the hand-held instrument furnished with guide rollers only permits a straight-line movement in the X-direction, the starting point on the left-hand picture edge used as the Y-axis will have to be provided with codes 113 printed as thin almost invisible bars or drawn in a more complex and less accurate way on each of the printed sheets 110 to be measured anew with the aid of a rule. At the meeting point between the codes and the picture edge, the measuring head 3 can be accurately positioned to be then shifted to the right toward the selected point 111' of the picture. To that extent, the distance 114 determined prior to the printing start and stored in the measuring instrument or in the computer will have to be covered. The distance 114 during displacement of the measuring instrument is measured by the rotary encoder 15 and, after reaching of the selected point of measurement in the display 5 of the hand-held instrument or on the monitor of a computer connected by data cable is visually displayed or audibly signaled. The measurement can then be initiated.

Figure 6:
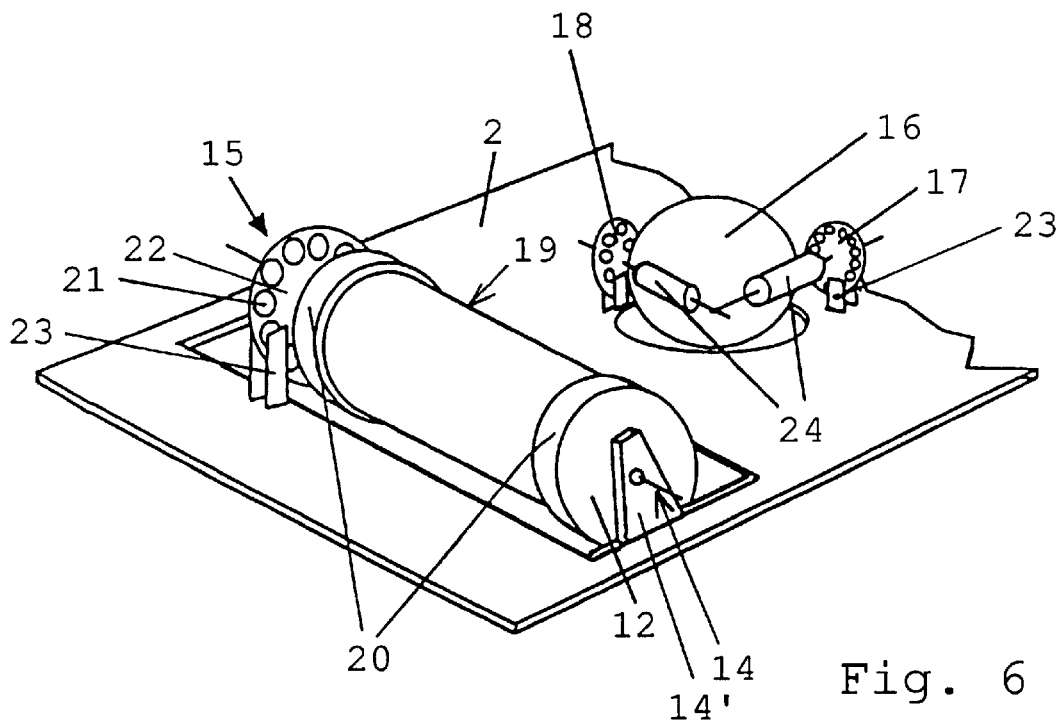
FIG. 6 is a perspective view of part of the base plate as a special form of embodiment of the hand-held instrument for performing measurements within the picture.

The provision of such codes 113 can be foregone if the hand-held instrument as shown in FIG. 6—in addition to the guide roller 12 and the rotary encoder 15—comprises an omnidirectionally movable ball 16 with two rotary encoders 17 and 18 acted upon by the movement of the ball through small rollers 24 in contact therewith. The ball 16 with the rotary encoders 17, 18 thereof is suitable to simultaneously and independently control distances in the X and Y directions. The process of measuring within the picture according to FIG. 5 is such that the hand-held instrument is positioned in one of the corner points of the field 109 to be moved directly, i.e. in a direction oblique to the selected point of measurement. To avoid a defective positioning it will only be necessary that the hand-held instrument when placed in the corner point 112 of the field 109 and after reaching the point of measurement 111' be arranged in parallel to the upper or lower edge of the picture which can be judged by the operator's eye with adequate accuracy. To avoid slip during rolling along the printed sheet 110 the ball is made of a material little slidable.

Providing the measuring instrument with ball 16 and guide roller 12, involves the advantage that the important function, i.e. scanning of printing control strips 101 and of measuring field rows 105 of the test charts can be performed without affecting an easy operation because the ball 16 has no bearing on the displacement of the hand-held instrument in the longitudinal axis thereof, whereas during measuring within the field of the picture a slightly higher resistance caused by the guide roller 12 will to be overcome. However, such a resistance does not affect the positioning accuracy. The latter described embodiment of the hand-held instrument can be universally used for alternate measurements on printing control strips and within the printed picture.

Figure 7:
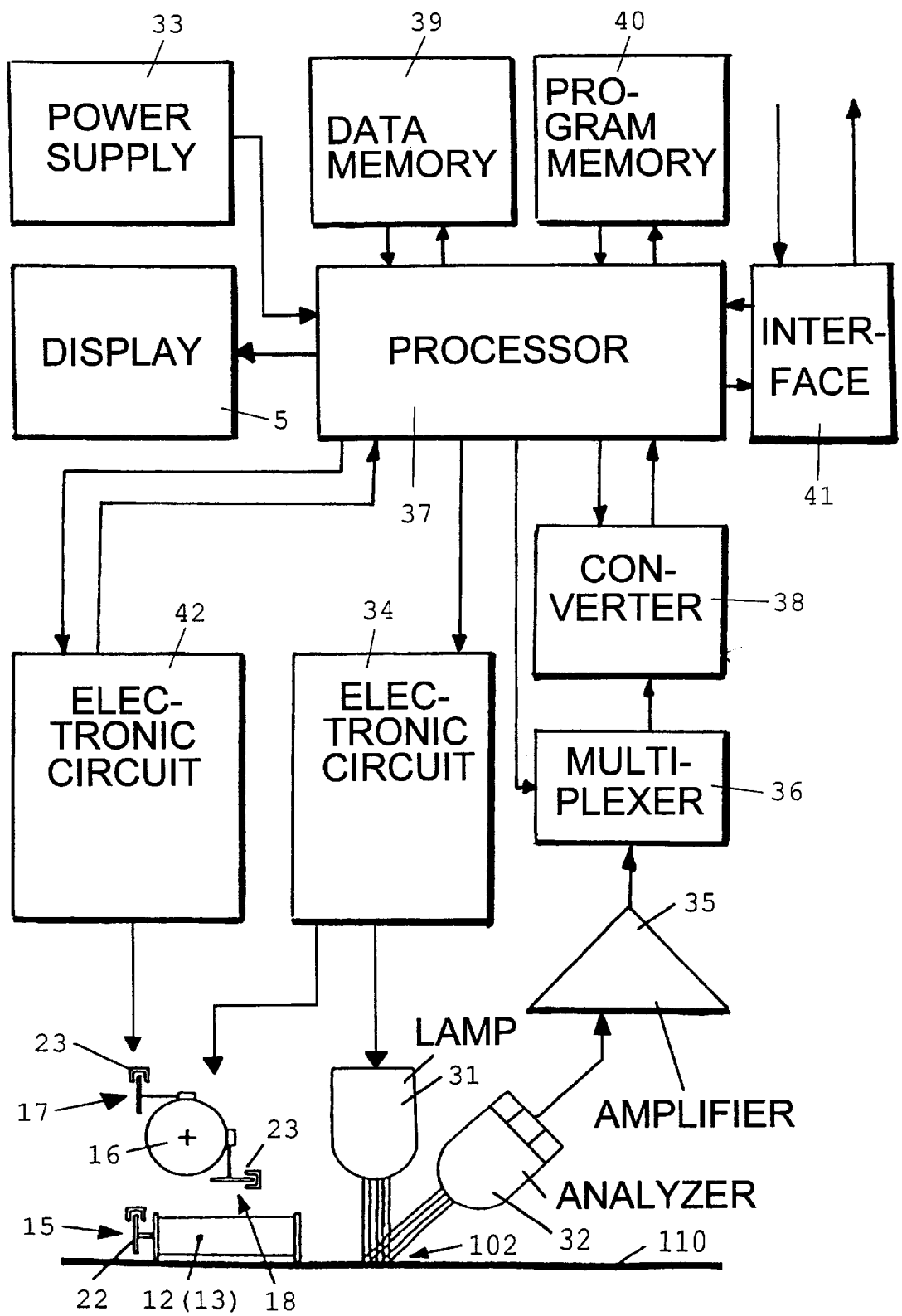
FIG. 7 shows the block diagram of the electronic circuit of a preferred form of embodiment of the hand-held instrument.

As to the measuring and evaluating electronic unit required for the preferred embodiment, reference is made to FIG. 7 showing the block diagram of the electronic circuit of the hand-held instrument. The hand-held instrument operates according to the standardized 0°/45° measuring geometry, with the measuring plane 102 being vertically illuminated by the measuring light lamp 31 contained in the measuring head 3, and the reflected light taken up by analyzer 32 also located within the measuring head 3, at an angle of 45°. The analyzer 32, in known manner, can be made up of several photodiodes having pre-mounted filters, or of a grid-diode module for spectral-photometric measurements. The distance is measured by the guide roller 12 and the movable ball 16 and the rotary encoders 15 and 17, 18. The power supply to the measuring instrument, preferably, is independent of the mains and is through batteries the voltage of which in terms of intensity, polarity and constancy is so prepared in the electronic circuit 34 as to enable all of the units to be supplied with the required energy. The analog signals of the analyzer 32 are supplied to an amplifier 35 and a multiplexer 36 controlled by the processor 37 and circuiting the analog signals of the photodiodes of the analyzer 32 in permanent cycles at a high frequency, passing the same to an AD-converter 38 (AD=analog-digital) to effect conversion of the analog signals into digital signals. The AD-converter 38 controlled by processor 37 supplies the digital signals for further processing to processor 37 corresponding to the data memory 39 and the program memory 40. The processor 37 controls all the rest of the functions of the hand-held instrument, with the control and the data exchange with the circuit 42 of the rotary encoder 15, 17, 18 forming part thereof, and also controls the display 5. Via a bidirectional standard interface 41, the data exchange also can be performed through a computer (not shown). Of a special significance are the control and computing operations performed by processor 37 processing the measuring signals as well as the signals of the rotary encoders and placing them in relationship with respect to one another.

Figure 8:
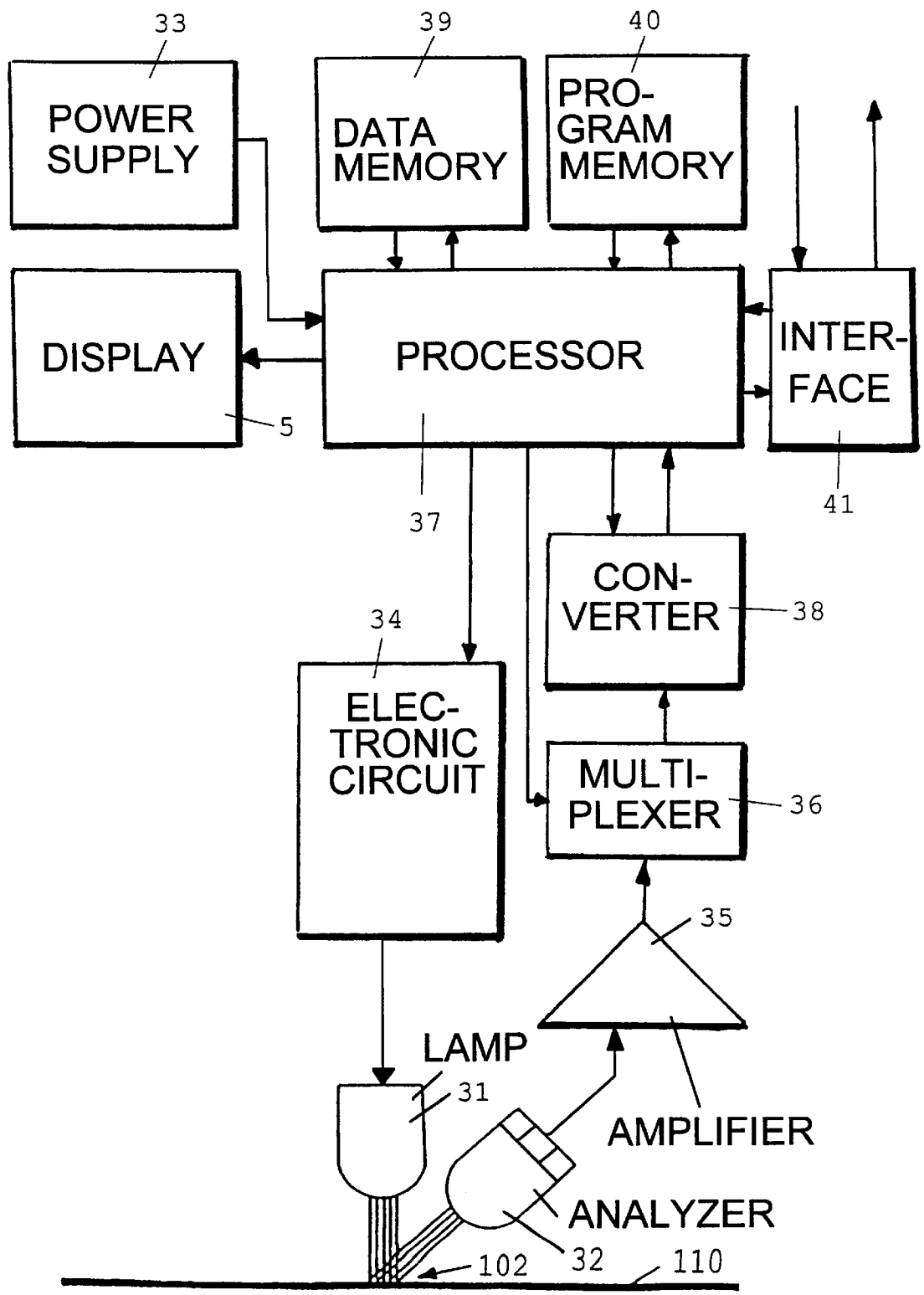
FIG. 8 shows the block diagram of the electronic circuit for the hand-held instrument according to FIG. 1.

In the simple-designed embodiment of the hand-held instrument according to FIG. 11 the electronic system is reduced as shown in FIG. 8 designating corresponding electronic elements by identical reference numerals.

What is claimed is:

1. A hand-held instrument for reflection measurements on printed products and test charts, comprising:

a housing including a base plate, a measuring head, a display, a plurality of operating keys, a measuring and evaluating electronic unit, and a guide plate, wherein the guide plate is arranged parallel to a mounting side of the measuring head, adjacent a bottom longitudinal edge of the housing, and the guide plate protrudes beyond the bottom longitudinal edge of the housing, and forms a recess for viewing control fields.

2. The hand-held instrument of claim 1, wherein the parallel guide plate is formed of an edge of the base plate protruding beyond a longitudinal lateral face of the housing.

3. The hand-held instrument of claim 1, wherein at least three discs of a crowned configuration, made of a highly slidable material and protruding from the base plate face by a few tenths of a millimeter are arranged on the mounting side of the base plate.

4. The hand-held instrument of claim 1 having at least one guide roller positioned on the base plate in a direction substantially transverse to a direction of movement during scanning and protruding downwardly from the base plate.

5. The hand-held instrument of claim 4, wherein the at least one guide roller is provided on the base plate, the guide roller having a longitudinal axis, two opposing ends, and a flat groove extending about the longitudinal axis of the guide roller, the flat groove forming two roll-off rings, each roll-off ring positioned adjacent each opposing end of the guide roller.

6. The hand-held instrument of claim 4, wherein the at least one guide roller is provided with an electronic rotary encoder in communication with an electronic circuit for evaluating and converting the signals thereof into distances, and the circuit, in turn, is in communication with the measuring and evaluating electronic unit.

7. The hand-held instrument of claim 4, wherein an omnidirectionally movable ball is positioned on the base plate, adjacent electronic rotary encoders, spaced away from the guide roller, the ball protruding downwardly with respect to the base plate.

8. The hand-held instrument of claim 6, wherein means for identifying the direction of movement are arranged on the rotary encoder.

* * * * *

UNITED STATES PATENT AND TRADEMARK OFFICE
CERTIFICATE OF CORRECTION

PATENT NO. : 5,986,769
DATED : November 16, 1999
INVENTOR(S) : Ulrich Krzyminski It is certified that error appears in the above-identified patent and that said Letters Patent is hereby corrected as shown below:

Column 8 Line 57 "FIG. 11" should read --FIG. 1--.

Signed and Sealed this

Fifth Day of September, 2000

Attest:

Q. TODD DICKINSON

Attesting Officer

Director of Patents and Trademarks